US010352174B2

(12) United States Patent
Heselhaus (10) Patent No.: US 10,352,174 B2
(45) Date of Patent: Jul. 16, 2019

(54) FILM-COOLED GAS TURBINE COMPONENT

(71) Applicant: Siemens Aktiengesellschaft, Munich (DE)

(72) Inventor: Andreas Heselhaus, Düsseldorf (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 15/539,259

(22) PCT Filed: Dec. 16, 2015

(86) PCT No.: PCT/EP2015/079998
§ 371 (c)(1),
(2) Date: Jun. 23, 2017

(87) PCT Pub. No.: WO2016/110387
PCT Pub. Date: Jul. 14, 2016

(65) Prior Publication Data
US 2017/0350257 A1 Dec. 7, 2017

(30) Foreign Application Priority Data
Jan. 9, 2015 (EP) .................................... 15150577

(51) Int. Cl.
*F01D 5/18* (2006.01)
*F01D 5/20* (2006.01)
*F01D 11/10* (2006.01)

(52) U.S. Cl.
CPC .............. *F01D 5/186* (2013.01); *F01D 5/20* (2013.01); *F01D 11/10* (2013.01);
(Continued)

(58) Field of Classification Search
CPC .................................. F01D 5/186; F01D 5/20
See application file for complete search history.

(56) References Cited

U.S. PATENT DOCUMENTS 4,653,983 A * 3/1987 Vehr ..................... B23H 9/10
415/115
5,382,133 A 1/1995 Moore et al.
(Continued)

FOREIGN PATENT DOCUMENTS

| JP | H07253003 A | 10/1995 |
|---|---|---|
| JP | H1054203 A | 2/1998 |

(Continued)

OTHER PUBLICATIONS

JP Office Action dated Dec. 11, 2017, for JP patent application No. 2017-536273.
(Continued)

*Primary Examiner* — Justin D Seabe
*Assistant Examiner* — Sabbir Hasan
(74) *Attorney, Agent, or Firm* — Beusse Wolter Sanks & Maire (57) ABSTRACT

A film-cooled gas turbine component for a gas turbine has a surface exposed to a hot gas and a number of film-cooling openings open out, which film-cooling openings combined to form at least one row transverse to a flow direction of the hot gas. Each of the film-cooling openings has a duct section and a diffuser section having an upstream diffuser edge, two diffuser longitudinal edges and a downstream diffuser edge. At least two immediately adjacent film-cooling openings, of the respective row have their duct axes of the respective duct sections laterally inclined relative to the local flow direction of the hot gas and their diffuser sections are formed asymmetrically with respect to a projection of the duct axis, such that immediately adjacent corner regions of the respective film-cooling openings are in alignment without the respective diffuser sections making contact with one another.

15 Claims, 4 Drawing Sheets

(52) U.S. Cl.
CPC ...... *F05D 2220/32* (2013.01); *F05D 2240/24* (2013.01); *F05D 2240/304* (2013.01); *F05D 2240/305* (2013.01); *F05D 2240/307* (2013.01); *F05D 2240/55* (2013.01); *F05D 2250/13* (2013.01); *F05D 2250/21* (2013.01); *F05D 2250/38* (2013.01); *F05D 2260/202* (2013.01); *Y02T 50/673* (2013.01); *Y02T 50/676* (2013.01)

(56) References Cited

U.S. PATENT DOCUMENTS

| | | | |
|---|---|---|---|
| 5,403,158 A | 4/1995 | Auxier | |
| 2013/0183165 A1* | 7/2013 | Lacy | F01D 5/186 |
| | | | 416/97 R |
| 2013/0205803 A1* | 8/2013 | Xu | F01D 5/186 |
| | | | 60/806 |

FOREIGN PATENT DOCUMENTS

| | | |
|---|---|---|
| JP | 3703866 B2 | 10/2005 |
| JP | 2011163123 A | 8/2011 |
| JP | 2013144981 A | 7/2013 |
| JP | 2014214632 A | 11/2014 |
| JP | 6134193 B2 | 5/2017 |
| RU | 2418174 C2 | 5/2011 |
| RU | 131416 U1 | 8/2013 |
| WO | 2013188645 A2 | 12/2013 |

OTHER PUBLICATIONS

Russian Federation office action dated Feb. 8, 2018, for RU patent application No. 2017128224.
EP Search Report dated Jul. 13, 2015, for EP patent application No. 15150577.3.
International Search Report dated Feb. 25, 2017, for PCT/EP2015/079998.
IPPR (PCT/IPEA/416 and 409) dated Jan. 2, 2017, for PCT/EP2015/079998.
KR Notice of Allowance dated Nov. 24, 2017, for KR patent application No. 1020177019432.

* cited by examiner

FIG 5

FILM-COOLED GAS TURBINE COMPONENT

CROSS REFERENCE TO RELATED APPLICATIONS

This application is the US National Stage of International Application No. PCT/EP2015/079998 filed Dec. 16, 2015, and claims the benefit thereof. The International Application claims the benefit of European Application No. EP15150577 filed Jan. 9, 2015. All of the applications are incorporated by reference herein in their entirety.

FIELD OF INVENTION

The invention relates to a film-cooled gas turbine component for a gas turbine, having a surface which can be exposed to a hot gas and in which a number of film-cooling openings open out, which film-cooling openings can be combined to form at least one row in a direction transverse to a flow direction of the hot gas, wherein each of the respective film-cooling openings has, along its throughflow direction, a duct section and a diffuser section directly adjoining the duct section, which diffuser section comprises an upstream diffuser edge, two diffuser longitudinal edges and a downstream diffuser edge, wherein each longitudinal edge intersects the downstream diffuser edge at a corner region.

BACKGROUND OF INVENTION

In the prior art, numerous different gas turbine components are known which have the film-cooling openings described in the introduction. For example, WO 2013/188645 discloses a turbine blade having film-cooling openings, the diffuser-like region of which transitions into two vane regions which are separated by a rib. The film-cooling openings are used in a known manner with the aim of preventing premature damage to the material or to the gas turbine component, in order that the predetermined service life is attained. In detail, it is sought by means of the film-cooling openings to provide an areal cooling film over the surface of the gas turbine component in order, during operation, to protect the surface against the damaging influences of the hot gas flowing along it. The cooling air required for forming the cooling film must however be provided. Said cooling air is often extracted from the cycle of the gas turbine, such that the extracted fraction cannot participate in the generation of energy. This reduces the efficiency of the gas turbine, such that there is likewise a desire to keep the cooling-air flow rate as low as possible. Furthermore, there is a need to keep the number of film-cooling holes low, which leads not only to a saving of cooling air but also to a gas turbine component which is easier to produce and less expensive.

An alternative arrangement to this is known from the publication US 2013/0205803 A1. In said document, it is proposed that the widening film-cooling holes of a row make contact with one another. Here, the diffuser regions make contact along an edge, which diffuser regions in turn end at the downstream transverse edges of the adjacent diffusers. This creates a gapless row of closely successive corners with interposed rectilinear diffuser outlet edges, which can weaken the blade material.

It is also known for such film-cooling holes to be used not only for the areal cooling of the gas turbine component but also for the cooling of a so-called rubbing edge which is arranged at the free end of a turbine rotor blade and which is moved relative to a static housing wall of the flow path of the gas turbine. Such rubbing edges are likewise exposed to the hot gas influences, wherein, owing to their exposed position—they generally project perpendicularly in free-standing fashion from a turbine blade wall surface oriented approximately parallel to the flow-path delimitation of the gas turbine—said rubbing edges are, however, relatively difficult to cool.

In particular, in the prior art, an effect is noticeable whereby it is only with increasing distance from the film-cooling opening that the individual cooling-air filaments formed up to that point merge to form an areal cooling film. However, owing to the internal cooling-duct structure of the turbine blade and the thus predefined position of the film-cooling holes provided for the cooling of the rubbing edge, said film-cooling holes have hitherto been arranged too close to the rubbing edge to form a gapless cooling film. Consequently, viewed locally, hot-gas filaments arose in between the individual cooling-air filaments before the merging of the latter, which hot-gas filaments were able to cause local damage to the rubbing edge.

For this reason, it is desirable, in particular for rows of film-cooling openings used for the cooling of rubbing edges, for areally continuous cooling along the film-cooling row to be achieved as close as possible downstream of the film-cooling openings.

SUMMARY OF INVENTION

It is therefore an object of the invention to provide a gas turbine component having a film-cooling arrangement, in the case of which the formation of an uninterrupted cooling film begins, even for the region between two immediately adjacent film-cooling openings, as close as possible to the downstream edge of the film-cooling openings.

To achieve said object, the invention proposes that, in the case of a cooled gas turbine component having a surface which can be exposed to a hot gas and in which a number of film-cooling openings open out, which film-cooling openings can be combined to form a row in a direction transverse to a local flow direction of the hot gas close to the surface, wherein each of the respective film-cooling openings has, along its throughflow direction, a duct section and a diffuser section directly adjoining the duct section, which diffuser section comprises an upstream diffuser edge, two diffuser longitudinal edges and a downstream diffuser edge, wherein each diffuser longitudinal edge intersects the downstream diffuser edge at a corner region, at least two immediately adjacent film-cooling openings, advantageously all film-cooling openings, of the row are designed such that their duct axes of the respective duct sections are laterally inclined, that is to say slanted, relative to the local flow direction of the hot gas close to the surface and their diffuser sections are formed in each case asymmetrically with respect to a projection of the duct axis, in such a way that the immediately adjacent corner regions of immediately adjacent film-cooling openings are in alignment, or overlap, as viewed in the local flow direction of the hot gas, without the respective diffuser sections making contact with one another. Here, "laterally" means that the orientation of the duct axis has a component transverse to the flow direction of the hot gas close to the surface.

Here, the asymmetry of the diffuser sections relates to the rectilinear projection of the duct axis, which projection extends as far as the end of the diffuser section.

The invention is based on the realization that, owing to the slanting of the duct axes relative to the local flow direction of the hot gas, it is duly the case that the cooling air is blown out obliquely relative to the flow direction of the hot gas, but this is of no significance whatsoever with regard to the formation of the protective cooling film. This is owing to the fact that the momentum of the hot-gas flow is dominant to such an extent that the cooling air that emerges obliquely with respect thereto assumes the flow direction of the hot gas straight away, immediately after said cooling air exits the diffuser section. At the same time, the invention is based on the realization that, in addition to the laterally inclined orientation of the duct axes, the diffuser sections may likewise be formed asymmetrically. The downstream diffuser edges can be longer than previously, while maintaining a moderate opening angle of the diffuser, such that the spacings—as viewed perpendicular to the local flow direction of the hot gas—of the two immediately adjacent corner regions of immediately adjacent film-cooling openings can be substantially reduced, or at best even eliminated, whereby better interaction of the cooling air emerging from adjacent film-cooling openings can be achieved. In particular, it has proven to be advantageous that, if the immediately adjacent corner regions of the respective film-cooling openings are in alignment or overlap as viewed in the flow direction of the hot gas, the two individual cooling-air flows merge to form a closed cooling film in the immediate vicinity of the downstream diffuser edge. In other words, the spacing between the downstream diffuser edge and the location, downstream thereof, at which the individual cooling-air flows of each film-cooling opening form a virtually gapless and thus areal cooling film is significantly reduced by means of the invention.

Additionally, owing to the reduction of the drawing-in of hot gas owing to the absence of hot-gas regions between the individual filaments, the proposed invention also, in a manner that has been verified by experiments, improves the laterally averaged efficiency of the film cooling of a film-cooling row, whereby the material of the gas turbine component is further protected against the hot-gas influences.

Advantageous refinements are specified in the subclaims, which may be combined with one another in any desired manner.

In a first advantageous refinement of the gas turbine component, the diffuser sections equate to the impressions of a diffuser volume in the shape of a halved truncated pyramid, the volume of which is rotated through an angle of rotation about the duct axis in order to form the asymmetry of the diffuser section. In this way, the diffuser is recessed deeper into the surface of the blade at the incident-flow-side longitudinal edge than at the other longitudinal edge, such that the laterally propagating cooling-air flow in the diffuser is protected more effectively than before against the entraining effect of the hot gas flowing transversely over it. In detail, said rotation gives rise to a redistribution of the cooling air flowing out of the film-cooling opening, in such a way that the air flow is also conducted to that corner region of the film-cooling opening under consideration which is further remote from the duct section. Owing to the aligned and possibly overlapping arrangement of the corner regions of two adjacent diffusers, the row can, viewed as a whole, form an at least substantially gapless and homogenized cooling film of cooling air virtually directly downstream of the downstream diffuser edges, without the hot-gas filaments that initially arise between the cooling-air filaments in the prior art being able to form.

In experiments, it has been found that, in particular, an angle of rotation of 15° is particularly advantageous. Nevertheless, similar or equivalent effects of the redistribution of the cooling air from a single film-cooling opening are also achieved by means of values other than 15°.

It is furthermore advantageous if the upstream diffuser edge, the one or two diffuser longitudinal edges, and/or the downstream diffuser edge, of the respective diffuser section of both or all film-cooling openings is/are of substantially rectilinear form. Here, "substantially" means that possibly slightly rounded corner regions or slight bulges owing to a non-planar surface are not of significance. Depending on the lateral surface angle, angle of rotation and opening angle of the diffuser, the downstream diffuser edge is arranged more or less transversely with respect to the local flow direction.

In an embodiment, the downstream diffuser edge of the respective diffuser section encloses an angle, which differs from 90°, with the local hot-gas flow direction. Said angle is advantageously 75°. This has the result that, in the case of a row of such film-cooling openings, the downstream corner regions of the respective diffuser sections no longer lie on a single common imaginary straight line. Rather, it is then the case that two parallel imaginary straight lines are present, on which either the left-hand corner regions or the right-hand corner regions of the respective diffuser sections are arranged.

This arrangement is based on the realization that, in the prior art, the corner regions lying on a single common imaginary straight line define a type of rectilinear perforation line with a relatively small corner spacing, along which defects and in particular cracks can occur relatively easily. In the refinement here, the corner regions which repeat as viewed along the row are now arranged offset with respect to one another. As a result, the spacing along the two imaginary straight lines between two corner regions situated on the same straight line has now been increased, which reduces the abovementioned weakening of the blade material, without the need to dispense with the gapless cooling film that forms at an early stage.

It is furthermore advantageous for the respective duct axes to be laterally inclined by an angle of inclination of approximately 50° with respect to the local flow direction of the hot gas close to the wall. Said angle value has proven to be particularly advantageous in experiments, because, with increasing angle of inclination, the spacing between two immediately adjacent film-cooling openings can also be increased, while firstly maintaining a cooling film which is still efficient and secondly achieving film cooling which still extends an adequate distance downstream.

The gas turbine component is particularly advantageously designed as an internally cooled and film-cooled turbine rotor blade having—arranged in succession along a radial direction—a blade root, a platform and an aerodynamically profiled blade airfoil, which blade airfoil comprises a suction-side wall and a pressure-side wall which both in relation to profile chords of the blade airfoil—extend from a leading edge of the blade airfoil to a trailing edge of the blade airfoil and in relation to the radial direction—extend from a hub-side end to a freely ending blade airfoil tip, wherein, on the blade airfoil tip, at least on the pressure side, there is provided a rubbing edge, wherein at least one of the rows of film-cooling openings is, at the pressure side along the profile chord, at an approximately constant distance from the rubbing edge for the cooling thereof.

Here, it is advantageous in particular that, with decreasing distance from the trailing edge, the spacings between two immediately adjacent film-cooling openings increase, and/or that, with decreasing distance from the trailing edge, the duct axes are slanted to an increasing degree with respect to the trailing edge. In particular, this refinement permits virtually gapless formation of a cooling film along the profile chord, for the complete protection of the rubbing edge, with a relatively small number of film-cooling openings, without the initial presence of cold and hot filaments. Owing to this gapless film cooling, it is possible along the profile chord for a very large region of the rubbing edge to be cooled in areal and gapless fashion, such that the wear phenomena that arise in the prior art can be avoided. Since the positioning and orientation of the individual film-cooling openings along the profile chord are, for the first time, performed taking into consideration the local hot-gas flow direction close to the wall, and the spacings between two immediately adjacent film-cooling openings can thus increase with decreasing distance from the trailing edge, a film-cooling row is proposed here which makes do with a smaller number of film-cooling openings than previously, and which can nevertheless provide a more effective cooling film than in the prior art. This protects the rubbing edges more effectively, reduces the cooling-air consumption and allows the turbine blade to thus be produced more cost-effectively, because the expenditure for the production of some film-cooling holes can be saved.

Altogether, the invention thus relates to a cooled gas turbine component for a gas turbine, having a surface which can be exposed to a hot gas and in which a number of film-cooling openings open out, wherein each of the respective film-cooling openings has, along its throughflow direction, a duct section and a diffuser section directly adjoining the duct section, which diffuser section comprises an upstream diffuser edge, two longitudinal edges and a downstream diffuser edge, wherein each longitudinal edge intersects the downstream diffuser edge at a corner region. To provide a particularly effective arrangement of film-cooling openings, in the case of which the location of the mixing of the individual cooling-air filaments of the individual film-cooling openings to form a substantially closed cooling-air film is arranged closer to the downstream diffuser edge than previously, it is proposed that at least two immediately adjacent film-cooling openings, advantageously all film-cooling openings, of the row are designed such that their duct axes of the respective duct sections are laterally inclined relative to the local flow direction of the hot gas close to the wall and their diffuser sections are formed in each case asymmetrically, in such a way that the immediately adjacent corner regions of the respective film-cooling openings are in alignment, or overlap, as viewed in the flow direction of the hot gas, without the respective diffuser sections making contact with one another.

BRIEF DESCRIPTION OF THE DRAWINGS

Further advantages and features of the invention will be discussed in more detail, on the basis of several exemplary embodiments, in the following description of the figures. In the figures, in each case schematically.

DETAILED DESCRIPTION OF INVENTION

In all of the figures, identical features are denoted by the same reference designations.

Figure 1:
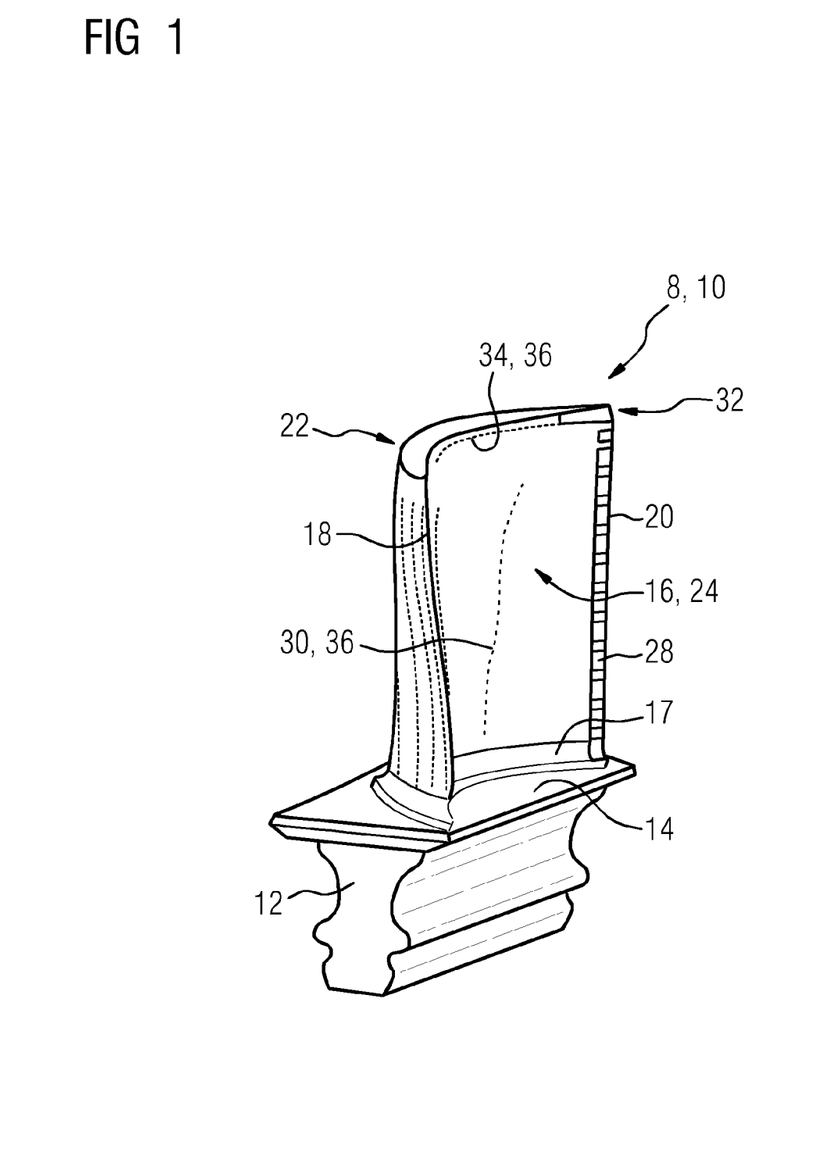
FIG. 1 shows a turbine rotor blade in a perspective illustration.

As a non-restrictive example of a cooled gas turbine component 8 of a gas turbine, FIG. 1 shows a turbine rotor blade 10 in a perspective illustration. The turbine rotor blade 10 comprises a blade root 12, which has a fir tree shape in cross section, and a platform 14 arranged on said blade root. The platform 14 is adjoined by an aerodynamically profiled blade airfoil 16, which has a leading edge 18 and a trailing edge 20. With regard to the installed situation of the turbine rotor blade 10 in the gas turbine, the blade airfoil 16 extends in a radial direction from a hub-side end 17 to a blade tip 32. At the leading edge 18, there are provided cooling openings which are arranged as a so-called "shower head", from which cooling openings a coolant, advantageously cooling air, which flows in the interior can emerge. The blade airfoil 16 comprises a suction-side wall 22 and a pressure-side wall 24. Along the trailing edge 20 there is provided a multiplicity of trailing-edge openings 28, referred to as "cut-back". A first row 30 of film-cooling openings 36 for the areal cooling of the pressure-side wall 24 is arranged approximately centrally between leading edge 18 and trailing edge 20. Likewise, a further film-cooling row 34 is arranged at the pressure side close to the blade tip 32. Said further film-cooling row serves for cooling a rubbing edge (not illustrated in any more detail in FIG. 1) of the turbine rotor blade 10 over a major part of its longitudinal extent between leading edge 18 and trailing edge 20. The geometry of the film-cooling openings according to the invention of the rows 30 and 34 will be discussed more specifically in detail below.

Figure 2:
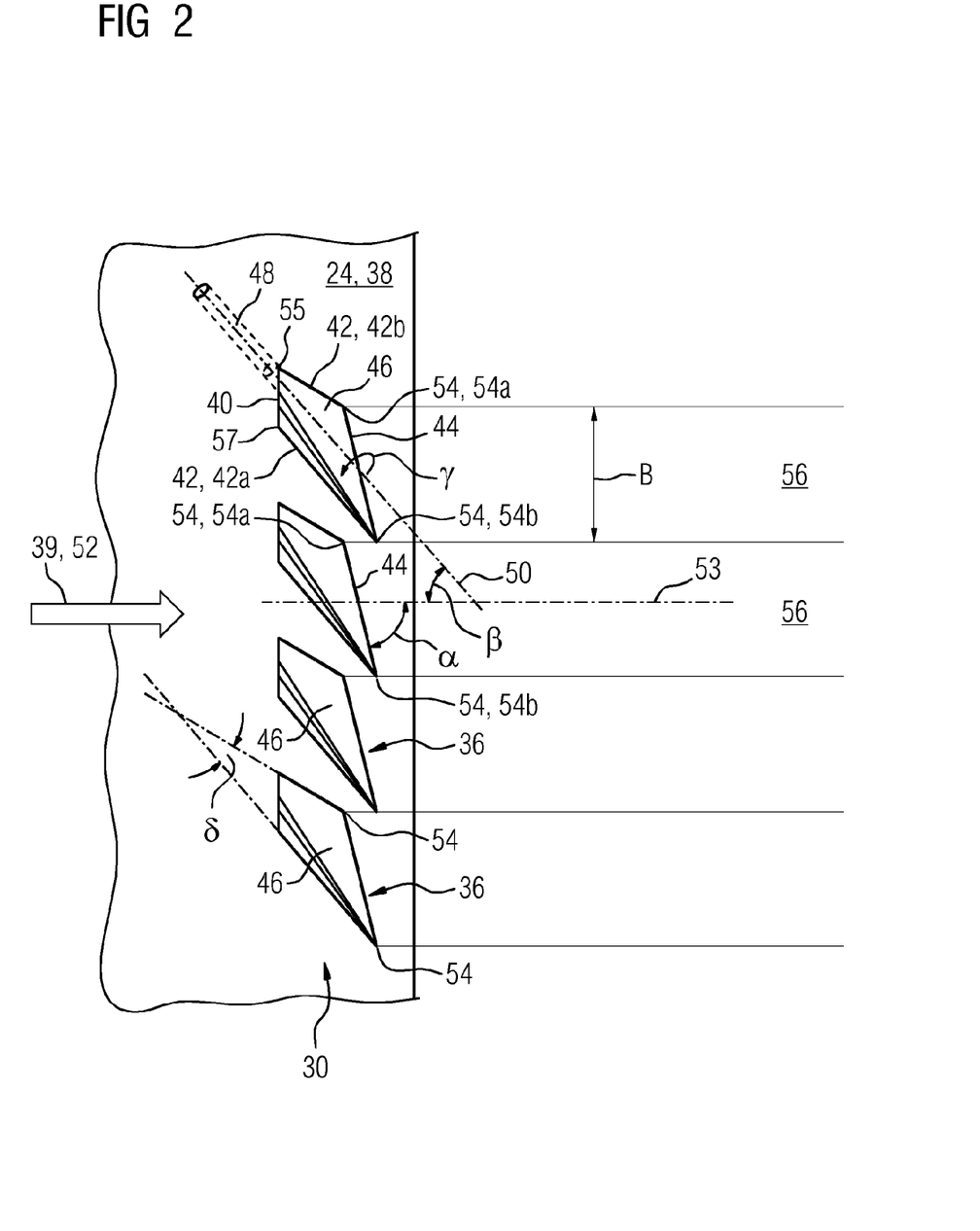
FIG. 2 shows a plan view of a row of film-cooling openings according to the invention.

FIG. 2 shows a plan view of a detail of the first row 30 of film-cooling openings 36 according to the invention, which open out in a surface 38, which can be exposed to a hot gas 39, of the turbine rotor blade 10. In the exemplary embodiment illustrated, the row 30 has only four film-cooling openings 36. The number of film-cooling openings 36 within the row may however vary and is in principle not of importance for the effect of the invention, as long as at least two film-cooling openings 36 are provided. Here, the spacings between the film-cooling openings 36 are identical in each case.

The hot gas 39 can be caused to flow in the illustrated direction along the surface 38 of the pressure-side wall 24. The local flow direction 52 close to the wall is thus parallel to the axis 53.

Each film-cooling opening 36 comprises a diffuser section 46, which is delimited by an upstream diffuser edge 40, by two diffuser longitudinal edges 42 and by a downstream diffuser edge 44. Upstream of the diffuser section 46, each film-cooling opening 36 comprises a duct section 48, wherein the latter is however shown only at the uppermost of the four illustrated film-cooling openings 36. In the context of the diffuser section, the expressions "upstream" and "downstream" relate to the flow direction of the hot gas.

Here, each diffuser longitudinal edge 42 intersects the downstream diffuser edge 44 at a corner region 54, such that, as per FIG. 2, each diffuser section 46 has an upper corner region and a lower corner region 54. The relative expressions "top" and "bottom" and the expressions "left" and "right" mentioned further below relate only to the illustrations provided here, and not to the position of the corner regions in the fully produced gas turbine component. Furthermore, the expressions "radial" and "axial" relate to the machine axis of a gas turbine which is not illustrated in any more detail. In this respect, said expressions are not to be understood as restrictive, and rather serve merely for explanation of the invention.

The diffuser edge 40 arranged upstream is shorter than the diffuser edge 44 arranged downstream, such that the region enclosed by the diffuser edges 40, 42, 44 forms a diffuser for the cooling air flowing out of the duct section 48 and flowing into the diffuser section 46, such that, within the diffuser, the cooling air, which is fed in in rather punctiform fashion, is distributed over the region between the two corner regions 54. The opening angle δ of the diffuser is enclosed between the two diffuser longitudinal edges 42, and in this exemplary embodiment amounts to approximately 20°.

In the exemplary embodiment shown, the volume of the diffuser has the shape of a halved truncated pyramid with an opening angle of in each case 10°. This means that the three oblique diffuser surfaces thus open at an angle of 10° with respect to the duct axis 50, and the surface of symmetry of the halved pyramid with 0°.

In the exemplary embodiment shown, it is the case at each film-cooling opening 36 that the upper longitudinal edge 42b and the downstream diffuser edge 44 intersect one another at an obtuse angle, whereas the lower longitudinal edge 42a and the downstream diffuser edge 44 intersect at an acute angle: the upper corner region 54 consequently has an obtuse angle, and the lower corner region 54 has an acute angle. Here, it is self-evident that the corner regions 54 need not imperatively be formed as corners. Consequently, slightly rounded corner regions are also possible. The diffuser section 46 is thus asymmetrical with respect to the duct axis 50 or the projection thereof.

Like the film-cooling opening 36 illustrated uppermost in FIG. 2, each other film-cooling opening 36 also has an upper corner region 54a and a lower corner region 54b.

Here, the lower longitudinal edge 42a is that one of the two longitudinal edges which is mainly impinged on by the hot gas 39 owing to the lateral inclination. Said longitudinal edge may consequently also be referred to as incident-flow-side longitudinal edge, wherein the diffuser is recessed deeper into the surface 38 at the corner region 57 of the lower longitudinal edge 42a and upstream diffuser edge 40 than at the corner region 55 of the upper longitudinal edge 42b and upstream diffuser edge 40.

During operation, the coolant, advantageously cooling air, is conducted from a cold-gas-side surface (not illustrated) of the gas turbine component 8 to be cooled, through the duct section 48 including through the diffuser section 46, to the surface 38 of the component wall to be cooled. According to the invention, it is now the case that, at two immediately adjacent film-cooling openings 36, the immediately adjacent corner regions 54 thereof are designed such that one corner region 54b (which in this case has an acute angle) of a first film-cooling opening 36 (the film-cooling opening illustrated uppermost in FIG. 2) is, as viewed in relation to the flow direction 52 of the hot gas, arranged downstream of the other corner region 54a (which in this case has an acute angle) of the film-cooling opening 36 arranged below the former film-cooling opening. This advantageously applies to the entire row of film-cooling openings 36. It is self-evidently also possible for two or more rows to be arranged one behind the other in the gas turbine component according to the invention.

Figure 3:
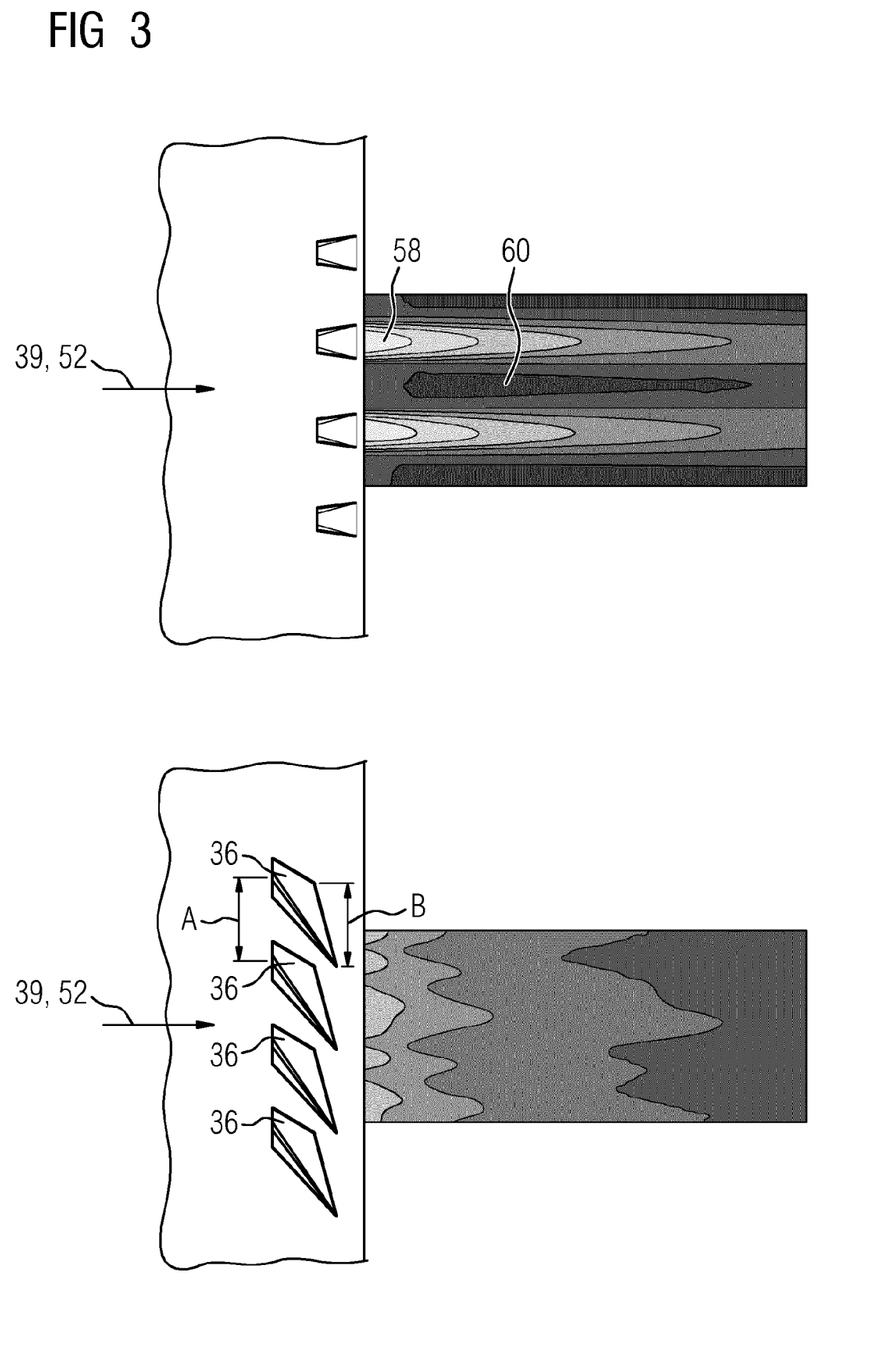
FIG. 3 shows a comparison of the local film-cooling effectiveness of conventional film-cooling openings and film-cooling openings according to the invention.

FIG. 3 shows the distribution of the film-cooling effectiveness downstream of the film-cooling openings, firstly for the film-cooling openings known from the prior art with a symmetrical diffuser (illustrated at the top in FIG. 3), and secondly for the film-cooling openings 36 according to the invention (illustrated at the bottom in FIG. 3). The cooling-air filaments 58 of each individual film-cooling opening, such as are initially present in the prior art, can be avoided by means of the arrangement according to the invention. As viewed perpendicular to the flow direction 52 of the hot gas 39, the temperature profile downstream of the film-cooling openings 36 according to the invention is much more uniform than in the prior art. This has the effect that an areal film-cooling flow, which thus has substantially no hot-gas filaments 60, can form much closer to the downstream diffuser edge 44 than in the prior art.

The film-cooling openings 36 and thus in particular the duct sections 48 thereof may have been produced by a chip-removing drilling process, laser drilling or else by erosion, or else in some other way. The cross-sectional shape of the duct section 48 is commonly circular. Other shapes of the throughflow cross section are likewise conceivable. In general, the duct section 48 is formed rectilinearly along its duct axis 50, wherein the duct axis 50 extends rectilinearly, as a virtual variable, as far as the downstream end of the diffuser section 46 and beyond.

Referring again to FIG. 2, the film-cooling openings 36 according to the invention are characterized in that the duct axis 50 is laterally inclined by an angle of inclination β with respect to the local flow direction 52 of the hot gas 39, and mutually adjacent film-cooling openings 36 do not make contact with one another. In experiments, it has been found that an inclination angle of β=50° is particularly advantageous. However, said value is not restrictive, such that said value may also deviate therefrom owing to differently selected boundary conditions.

In relation to the film-cooling openings known from the prior art (see FIG. 3, illustrated at the top), which have a symmetrical diffuser section, the diffuser sections according to the invention are asymmetrical. The asymmetry is realized by means of a rotation of the diffuser about the duct axis 50. In the experiments, it has also been found that the rotation through an angle of rotation γ with a magnitude of 15° is particularly advantageous. The rotation of the diffuser may also be described by the statement that the diffuser section 46 equates to the impression of a diffuser volume with the shape of a halved truncated pyramid, and the rotation thereof is performed about the duct axis 50 through the angle of rotation γ.

Owing to the asymmetrical configuration of the diffuser section 46, the inclination angle β, the selected angle of rotation γ and an obtuse surface angle (not designated in any more detail) of a diffuser base surface 37 with respect to the surface 38, the downstream, rectilinear diffuser edge 44 is oriented not perpendicular to the flow direction 52 of the hot gas 39 but, in this exemplary embodiment, at an angle α of approximately 75°. This has the result that—in relation to the flow direction 52 of the hot gas 39—the obtuse-angled corner region 54 can be arranged upstream of the acute-angled corner region 54. In this way, the spacing between two immediately adjacent film-cooling openings can be selected such that said two corner regions 54 of said film-cooling openings 36 can be in alignment as viewed in the flow direction 52 of the hot gas, without the diffuser sections of said film-cooling openings making contact with one another. This has the result that the width B (FIG. 3), measurable perpendicularly to the hot-gas flow direction 52, of the downstream diffuser edges 44 of each individual film-cooling opening, and thus the cooling-air filaments 56 that can be generated thereby, can be large enough that said cooling-air filaments are tangent to one another immediately downstream of the diffuser outflow edges 44, and even possibly overlap slightly, without the need for a greater density of film-cooling openings for this purpose. A greater density would be achieved by reducing the spacing A (cf. FIG. 3).

Figure 4:
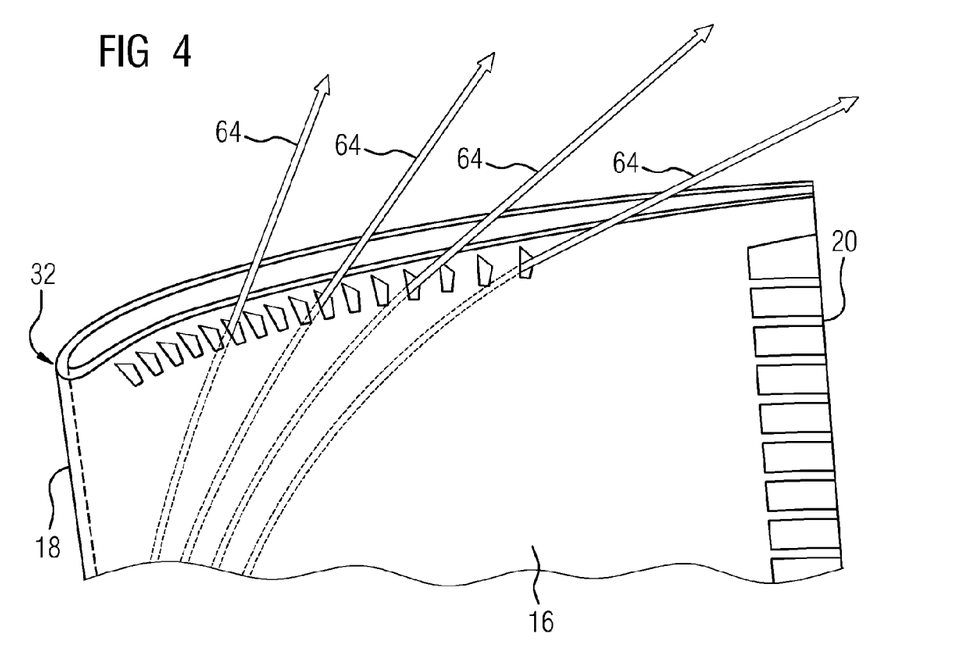
FIG. 4 shows an illustration of the differently directed hot-gas flows close to the wall in the region of a turbine rotor blade tip.

FIG. 4 shows a perspective illustration of the blade airfoil 16 of the turbine rotor blade 10, in which the locally different flow directions of the hot gas close to the wall at the blade tip are represented by arrows 64. With progressively closer proximity to the trailing edge 20 of the blade airfoil 16, the local hot-gas flows 64 close to the wall that arise at the blade tip 32 have a greater axial flow component than in the vicinity of the leading edge 18. Consequently, hot-gas flows 64 arranged closer to the leading edge 18 are oriented more in the radial direction than in the axial direction.

Figure 5:
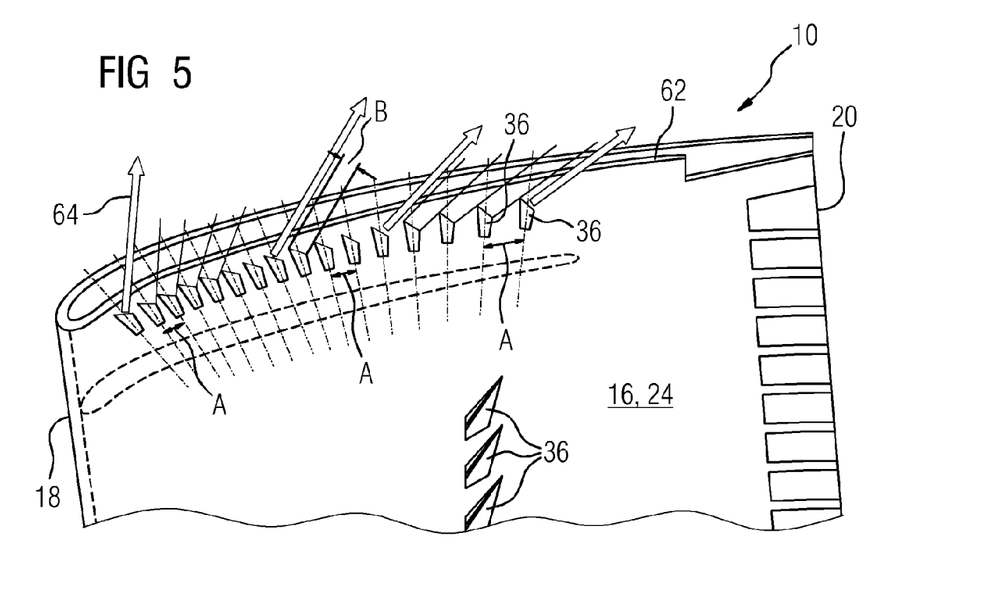
FIG. 5 shows the perspective illustration of the blade tip of a turbine rotor blade with film-cooling openings designed and arranged according to the invention.

Taking into consideration the local hot-gas flow directions at the blade airfoil tip and the realization that, with the aid of the film-cooling openings 36 according to the invention, areally gapless film cooling can be provided much closer to the downstream edge 44 of the diffuser section 46 than in the prior art, this arrangement is particularly suitable for the cooling of a rubbing edge 62 of the blade airfoil 16 (FIG. 5).

In the case of the film-cooling row 34 according to the invention, which is arranged radially with a approximately constant spacing to the rubbing edge 62, it is thus possible for the film-cooling openings 36 to be distributed along the profile chord with a spacing A which increases with closer proximity of the position of the film-cooling openings 36 to the trailing edge 20. It can be seen from FIG. 5 that the obtuse-angled corner regions 54 of a first film-cooling opening 36, which in this case is situated further to the left, and the acute-angled corner regions 54 of the (second) film-cooling opening arranged immediately adjacent thereto to the right are arranged relative to one another such that the cooling-air flow emerging from the first film-cooling opening 36 is at least tangent to the cooling-air flow of the second film-cooling opening 36. In the case of the film-cooling openings 36 of the row 34, too, the duct axes 50 of the film-cooling openings 36 are in each case inclined by approximately 50° relative to the locally changing direction of the hot-gas flow close to the wall, such that, with closer proximity to the trailing edge 20, the orientation of the respective duct axes 50 also changes. Owing to the selected perspective of the illustration in FIG. 5 and the arched surface of the pressure side, the viewer is looking onto the surface not perpendicularly at all points but rather, in part, tangentially. As a result, the indicated inclination angles can be perceived differently. Nevertheless, in this way, a cooling film can be provided which is substantially gapless as viewed in the direction of the film-cooling row. Expressed in a technically correct sense, this means that, at the locations downstream of the downstream diffuser edge 44, and in between, the differences between the local temperatures can be significantly reduced.

In particular, by means of the abovementioned refinement, it is possible for the rubbing edges 62 of turbine rotor blades 10 to be protected against the damaging influences of the hot gas, and thus the service life thereof can be significantly lengthened, without occurrence of the wear phenomena mentioned in the prior art.

Even though the invention has been more specifically illustrated and described in detail on the basis of the preferred exemplary embodiments, the invention is not restricted to the disclosed examples, and other variations may be derived here from by a person skilled in the art without departing from the scope of protection of the invention. For example, the gas turbine component may be configured as a ring-shaped segment of a hot-gas duct wall, or else as a combustion chamber wall of the gas turbine.

The invention claimed is:

1. A gas turbine component for a gas turbine, comprising:
a surface to be exposed to a hot gas and in which a number of film-cooling openings open out, wherein the number of film-cooling openings combine to form at least one row in a direction transverse to a flow direction of the hot gas,
wherein each of the respective film-cooling openings comprises, along its throughflow direction, a duct section and a diffuser section directly adjoining the duct section, wherein each diffuser section comprises an upstream diffuser edge, two diffuser longitudinal edges and a downstream diffuser edge, and wherein in each diffuser section each diffuser longitudinal edge intersects the downstream diffuser edge at a respective corner region, and
wherein at least two immediately adjacent film-cooling openings of the at least one row are designed such that duct axes of the respective duct sections are laterally inclined relative to a local flow direction of the hot gas and the diffuser sections are formed in each case asymmetrically with respect to a projection of a duct axis and in such a way that when viewing the at least two immediately adjacent film-cooling openings from above the surface, immediately adjacent corner regions of the at least two immediately adjacent film-cooling openings are laterally aligned with the local flow direction, or laterally overlap each other perpendicular to the local flow direction, without the respective diffuser sections making contact with one another.

2. The gas turbine component as claimed in claim 1, in which the respective diffuser sections equate to impressions of a diffuser volume in a shape of a halved truncated pyramid, a volume of which is rotated through an angle of rotation ($\gamma$) about the duct axis from a position of symmetry of the diffuser volume in order to form the asymmetry.

3. The gas turbine component as claimed in claim 2, in which the angle of rotation ($\gamma$) amounts to 15°.

4. The gas turbine component as claimed in claim 3, in which the downstream diffuser edge of the respective diffuser section forms an angle ($\alpha$) with the local flow direction which differs from 90°.

5. The gas turbine component as claimed in claim 1, in which the upstream diffuser edge, one diffuser longitudinal edge of the two diffuser longitudinal edges, the two diffuser longitudinal edges, or the downstream diffuser edge of the respective diffuser section are substantially rectilinear.

6. The gas turbine component as claimed in claim 1, in which the respective duct axes are inclined by an angle of inclination ($\beta$) of 50° with respect to the local flow direction of the hot gas.

7. The gas turbine component as claimed in claim 1, which is designed as a cooled turbine rotor blade comprising an aerodynamically profiled blade airfoil, which blade airfoil comprises a suction-side wall and a pressure-side wall which both—in relation to profile chords of the blade airfoil—extend from a leading edge of the blade airfoil to a trailing edge of the blade airfoil and—in relation to a radial direction—extend from a hub-side end to a freely ending blade airfoil tip, wherein, on the blade airfoil tip, at least on a pressure side, there is provided a rubbing edge, wherein the at least one row of the number of film-cooling openings is distributed at the pressure side along a respective profile chord at an approximately constant distance from the rubbing edge for the cooling thereof.

8. The gas turbine component as claimed in claim 7, in which, with decreasing distance from the trailing edge, respective spacings between two immediately adjacent film-cooling openings increase.

9. The gas turbine component as claimed in claim 7, in which, with decreasing distance from the trailing edge, the duct axes are slanted to an increasing degree with respect to the trailing edge.

10. The gas turbine component as claimed in claim 1, wherein all film-cooling openings of the at least one row are designed such that the duct axes of the respective duct sections are laterally inclined relative to a respective local flow direction of the hot gas, and the diffuser sections are formed in each case asymmetrically with respect to the projection of the duct axis and in such a way that when viewing from above the surface, immediately adjacent corner regions of adjacent diffuser sections of the number of film-cooling openings are laterally aligned with each other along the respective local flow direction, or laterally overlap each other along the respective local flow direction, and are located at different positions along the respective local flow direction, without the adjacent diffuser sections making contact with one another.

11. A gas turbine component for a gas turbine, comprising:
a surface to be exposed to a hot gas and comprising a number of film-cooling openings that combine to form at least one row in a direction transverse to a flow direction of the hot gas,
wherein each film-cooling opening comprises a duct section and a diffuser section directly adjoining the duct section,
wherein for each pair of immediately-adjacent diffuser sections there is a respective local flow direction of the hot gas over the pair,
wherein each diffuser section comprises an upstream diffuser edge and a downstream diffuser edge relative to the respective local flow direction,
wherein immediately-adjacent diffuser sections do not contact one another, and
wherein when viewing each pair of immediately-adjacent diffuser sections from above the surface, immediately-adjacent ends of the immediately-adjacent downstream diffuser edges are laterally aligned with the respective local flow direction or laterally overlap each other perpendicular to the local flow direction, and the immediately-adjacent ends are located at different positions along the local flow direction.

12. The gas turbine component for a gas turbine as claimed in claim 11, wherein each of the immediately-adjacent downstream diffuser edges is positioned obliquely relative to the respective local flow direction.

13. The gas turbine component for a gas turbine as claimed in claim 11, comprising an airfoil comprising the surface to be exposed to the hot gas.

14. The gas turbine component for a gas turbine as claimed in claim 13, wherein the at least one row is disposed along and configured to film cool a rubbing edge at a tip of the airfoil.

15. A gas turbine component for a gas turbine, comprising:
a surface to be exposed to a hot gas and in which a number of film-cooling openings open out, wherein the number of film-cooling openings combine to form at least one row in a direction transverse to a local flow direction of the hot gas,
wherein each of the respective film-cooling openings comprises, along its throughflow direction, a duct section and a diffuser section directly adjoining the duct section, wherein each diffuser section comprises an upstream diffuser edge, two diffuser longitudinal edges and a downstream diffuser edge, and wherein in each diffuser section each diffuser longitudinal edge intersects the downstream diffuser edge at a respective corner region,
wherein at least two immediately adjacent film-cooling openings of the at least one row are designed such that duct axes of the respective duct sections are laterally inclined relative to the local flow direction of the hot gas and the diffuser sections are formed in each case asymmetrically with respect to a projection of a duct axis and in such a way that immediately adjacent corner regions of the at least two immediately adjacent film-cooling openings are in alignment, or overlap, as viewed along the local flow direction of the hot gas, without the respective diffuser sections making contact with one another,
wherein the gas turbine component is designed as a cooled turbine rotor blade comprising an aerodynamically profiled blade airfoil, which blade airfoil comprises a suction-side wall and a pressure-side wall which both—in relation to profile chords of the blade airfoil—extend from a leading edge of the blade airfoil to a trailing edge of the blade airfoil and—in relation to a radial direction—extend from a hub-side end to a freely ending blade airfoil tip,
wherein, on the blade airfoil tip, at least on a pressure side, there is provided a rubbing edge,
wherein the at least one of row of the number of film-cooling openings is distributed at the pressure side along a respective profile chord at an approximately constant distance from the rubbing edge for the cooling thereof, and
wherein, with decreasing distance from the trailing edge, the duct axes are slanted to an increasing degree with respect to the trailing edge.

* * * * *